(12) United States Patent
Preisler et al.

(10) Patent No.: US 8,808,833 B2
(45) Date of Patent: Aug. 19, 2014

(54) COMPRESSION-MOLDED COMPOSITE COMPONENT HAVING A SANDWICH STRUCTURE AND HAVING INTEGRALLY FORMED STRENGTHENING STRUCTURES

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 69 days.

(21) Appl. No.: 13/690,566

(22) Filed: Nov. 30, 2012

(65) Prior Publication Data
US 2014/0154460 A1    Jun. 5, 2014

(51) Int. Cl.
*B32B 3/26* (2006.01)

(52) U.S. Cl.
CPC ...................................... *B32B 3/26* (2013.01)
USPC ........ 428/116; 296/39.1; 296/39.2; 296/39.3; 296/97.23; 428/95; 428/98; 428/99

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B65D 25/20
USPC .............. 428/95, 98, 99, 116; 296/39.1, 39.2, 296/39.3, 97.23
See application file for complete search history.

(56) References Cited

U.S. PATENT DOCUMENTS

| | | | |
|---|---|---|---|
| 5,502,930 | A | 4/1996 | Burkette et al. |
| 5,915,445 | A | 6/1999 | Rauenbusch |
| 6,050,630 | A | 4/2000 | Hochet |
| 6,102,464 | A | 8/2000 | Schneider et al. |
| 6,435,577 | B1 | 8/2002 | Renault |
| 6,537,413 | B1 | 3/2003 | Hochet et al. |
| 6,655,299 | B2 | 12/2003 | Preisler et al. |
| 6,682,675 | B1 | 1/2004 | Vandangeot et al. |
| 6,682,676 | B1 | 1/2004 | Renault et al. |
| 6,748,876 | B2 | 6/2004 | Preisler et al. |
| 6,790,026 | B2 | 9/2004 | Vandangeot et al. |
| 6,823,803 | B2 | 11/2004 | Preisler |
| 6,843,525 | B2 | 1/2005 | Preisler |
| 6,890,023 | B2 | 5/2005 | Preisler et al. |
| 6,981,863 | B2 | 1/2006 | Renault et al. |

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

A compression-molded, composite component having a sandwich structure and having integrally formed strengthening structures is disclosed. The component includes a first outer layer having an outer surface, a second outer layer, and a core positioned between the outer layers and having a large number of cavities. The outer layers are bonded to the core by press molding. Portions of at least one of the outer layers are sized, shaped and arranged laterally adjacent to each other in a pattern to provide the component with strength to resist deflection from a load at various positions and orientations at the outer surface.

24 Claims, 3 Drawing Sheets

(56) References Cited

U.S. PATENT DOCUMENTS

| | | | |
|---|---|---|---|
| 7,090,274 | B1 | 8/2006 | Khan et al. |
| 7,419,713 | B2 | 9/2008 | Wilkens et al. |
| 7,909,379 | B2 | 3/2011 | Winget et al. |
| 7,919,031 | B2 | 4/2011 | Winget et al. |
| 8,117,972 | B2 | 2/2012 | Winget et al. |
| 8,622,456 | B2 | 1/2014 | Preisler et al. |
| 8,690,233 | B2 | 4/2014 | Preisler et al. |
| 2003/0079659 | A1* | 5/2003 | Preisler et al. ............... 108/51.3 |
| 2005/0189674 | A1 | 9/2005 | Hochet et al. |
| 2006/0255611 | A1 | 11/2006 | Smith et al. |
| 2008/0105866 | A1 | 5/2008 | Jeong et al. |
| 2010/0026031 | A1 | 2/2010 | Jouraku |
| 2013/0278002 | A1 | 10/2013 | Preisler et al. |
| 2013/0278003 | A1 | 10/2013 | Preisler et al. |
| 2013/0278009 | A1 | 10/2013 | Preisler et al. |
| 2013/0278015 | A1 | 10/2013 | Preisler et al. |
| 2013/0278018 | A1 | 10/2013 | Preisler et al. |
| 2013/0278019 | A1 | 10/2013 | Preisler et al. |
| 2013/0278020 | A1 | 10/2013 | Preisler et al. |
| 2013/0280469 | A1 | 10/2013 | Preisler et al. |
| 2013/0280472 | A1 | 10/2013 | Preisler et al. |
| 2013/0280473 | A1 | 10/2013 | Preisler et al. |
| 2013/0312652 | A1 | 11/2013 | Preisler et al. |
| 2013/0316123 | A1 | 11/2013 | Preisler et al. |
| 2014/0077518 | A1 | 3/2014 | Preisler et al. |
| 2014/0077530 | A1 | 3/2014 | Preisler et al. |
| 2014/0077531 | A1 | 3/2014 | Preisler et al. |
| 2014/0145465 | A1 | 5/2014 | Preisler et al. |
| 2014/0145470 | A1 | 5/2014 | Preisler et al. |
| 2014/0147617 | A1 | 5/2014 | Preisler et al. |
| 2014/0147622 | A1 | 5/2014 | Preisler et al. |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Application No. 13/690,566, filed Nov. 30, 2012.
Related U.S. Application No. 13/762,921, filed Feb. 8, 2013.
Related U.S. Application No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

COMPRESSION-MOLDED COMPOSITE COMPONENT HAVING A SANDWICH STRUCTURE AND HAVING INTEGRALLY FORMED STRENGTHENING STRUCTURES

TECHNICAL FIELD

This invention generally relates to compression-molded composite components having sandwich structures and, in particular, to such components which have integrally formed strengthening structures.

BACKGROUND

Some compression-molded composites combine a lightweight, low-density core with fiber-reinforced thermoplastic skins or outer layers thereby resulting in a sandwich structure. The resulting composite component has a high stiffness-to-weight ratio thereby making it desirable for use in a wide variety of applications including load-bearing applications. In general, the thicker the core, the higher the load-bearing capacity of the composite component.

As a result of their high stiffness-to-weight ratio and load-bearing capacity, such compression-molded composites have been used as load floors in automotive applications and as skis or snowboards (i.e, sliding boards) in recreational applications.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a stampable reinforced thermoplastics material, a cellular core made of a thermoplastics material, and a second skin also made of a stampable reinforced thermoplastics material. The stack may also include one or more external covering layers made of a woven or non-woven thermoplastic material. The skins are typically pre-heated outside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core sandwich structure.

Panels of sandwich-type composition structure having a cellular core have rigidity characteristics sufficient to enable mechanical structures subjected to large stresses to be reinforced structurally without making them too heavy. Such panels are in common use in shipbuilding, aircraft construction, and rail vehicle construction.

The following U.S. patent documents are related to the present invention: U.S. Pat. Nos. 7,419,713; 6,890,023; 6,843,525; 6,537,413; 6,050,630; and 2005/0189674.

One problem associated with such composites is that their function and design freedom is limited by their designed material thickness.

Other U.S. patent documents related to the present invention include: U.S. Pat. Nos. 5,502,930; 5,915,445; 6,102,464; 6,435,577; 6,655,299; 6,682,675; 6,748,876; 6,790,026; 6,682,676; 6,823,803; 6,981,863; 7,090,274; 7,909,379; 7,919,031; 8,117,972; 2006/0255611; and 2008/0185866.

Another problem associated with the prior art is that it is often not desirable to increase the thickness of the core in order to increase the load bearing capacity of the composite component. Increasing the thickness of the core reduces the amount of available space in which the component is located. For example, in a vehicle, the amount of space available for storage is typically quite limited. By reducing the thickness of the core, the amount of available space useful for storage can be increased substantially especially if such components cover a relatively large surface area. One possible solution to the above problem is to provide additional supports at the underside of the component. However, this adds additional cost and weight to the component as well as taking away valuable storage space due to the increased thickness of the resulting component.

SUMMARY OF EXAMPLE EMBODIMENTS

An object of at least one embodiment of the present invention is to provide a compression-molded, composite component having a sandwich structure and having strengthening structures which are integral to the component without the need for separate strengthening structures thereby resulting in better dimensional control in manufacturing and fewer tolerance stack ups with increased design freedom.

In carrying out the above object and other objects of at least one embodiment of the present invention, a compression-molded, composite component having a sandwich structure is provided. The component includes a first outer layer having an outer surface, a second outer layer, and a core positioned between the outer layers and having a large number of cavities. The outer layers are bonded to the core by press molding. Portions of at least one of the outer layers are sized, shaped and arranged laterally adjacent to each other in a pattern to provide the component with strength to resist deflection from a load at various positions and orientations at the outer surface.

The portions may form an integral, unitary support structure.

The support structure may define a series of parallel ridges and grooves formed by the press molding.

The core may be a cellular core such as a thermoplastic core.

The core may be a honeycomb core such as a thermoplastic honeycomb core.

The outer layers including the first outer layer may be reinforced layers such as fiber-reinforced layers.

The component may have a thickness in a range of 5 to 25 mm. The outer layers may be thermoplastic layers and the core may be a thermoplastic core. The thermoplastic of the outer layers and the core may be polypropylene.

At least one, and preferably two, of the outer layers may be a woven outer layer.

The component may be capable of use in an automotive vehicle.

The component may be capable of use in the interior of a vehicle.

Portions of both of the outer layers may be sized, shaped and arranged laterally adjacent each other in a pattern to provide the component with strength to resist deflections.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
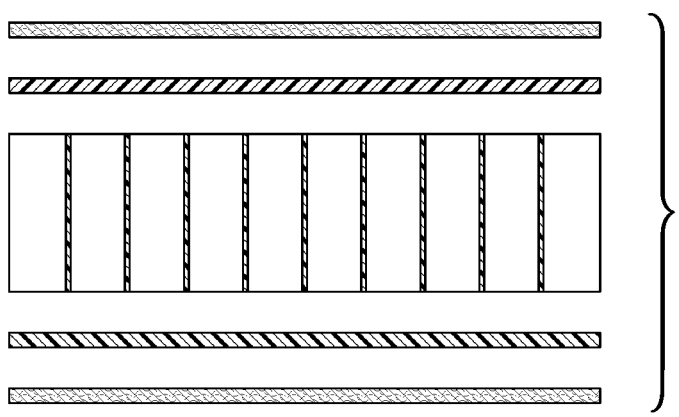
FIG. 1 is a side sectional view showing various separate layers of a prior art stack of thermoplastic-based layers of material.
Figure 2:
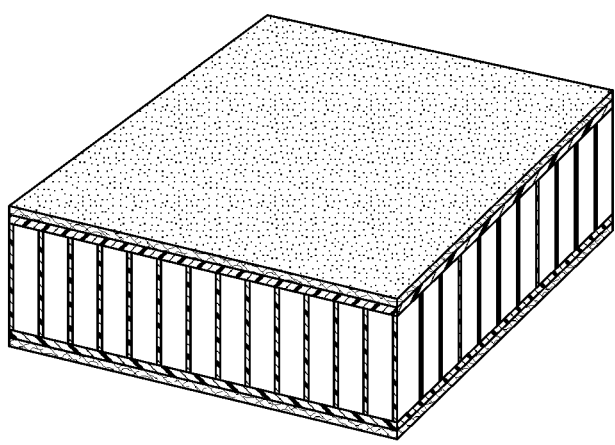
FIG. 2 is a top perspective sectional view, of the stack of FIG. 1 after low-pressure, cold compression molding.
Figure 3:
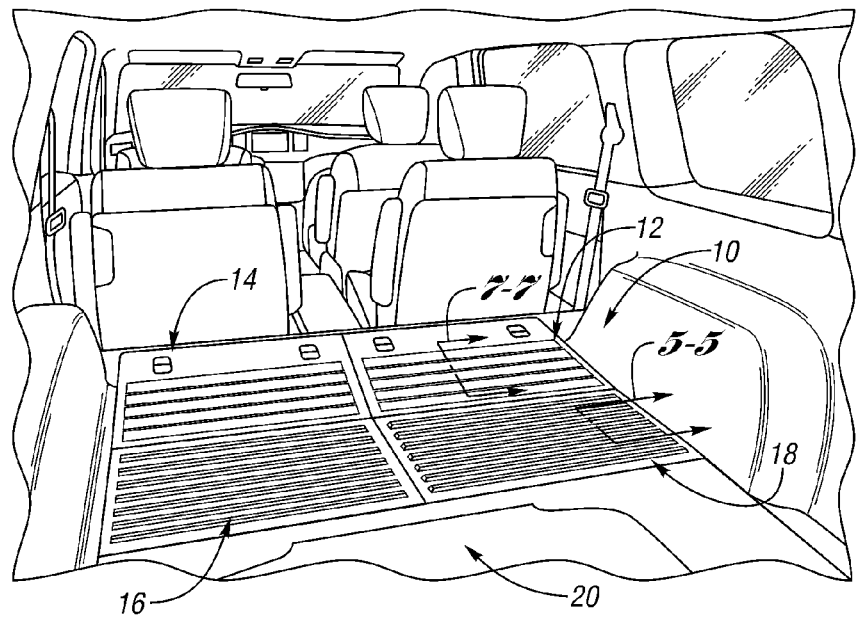
FIG. 3 is an environmental view, partially broken away, showing a pair of sandwich-type composite components or panels having living hinges and strengthening structures and a hinged cover in its closed position constructed in accordance with at least one embodiment of the present invention.
Figure 4:
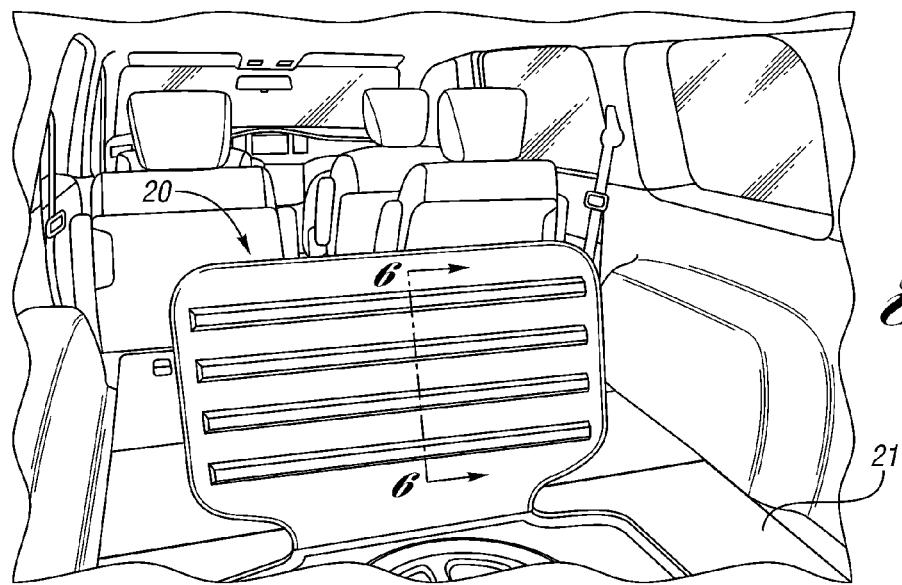
FIG. 4 is a simplified environmental view, similar to the view of FIG. 3, with the cover in its open position to show its strengthening structures.

Referring now to the drawing figures, FIGS. 3 and 4 show a plurality of compression-molded, composite components, generally indicated at 12, 14, 16, 18, 20 and 21, which make up an assembly such as a vehicle load floor assembly, generally indicated at 10, which may be positioned or supported at the rear of an automotive vehicle. Each of the compression-molded composite components 12, 14, 16, 18, 20 and 21, has a sandwich structure. The component or lid 20 is hingedly secured to the panel or component 21 and is shown in its closed position in FIG. 3 and in its open position in FIG. 4 to allow a stored vehicle component or load, such as a spare tire, to be accessed from a lower storage area in which the load is stored.

Figure 5:
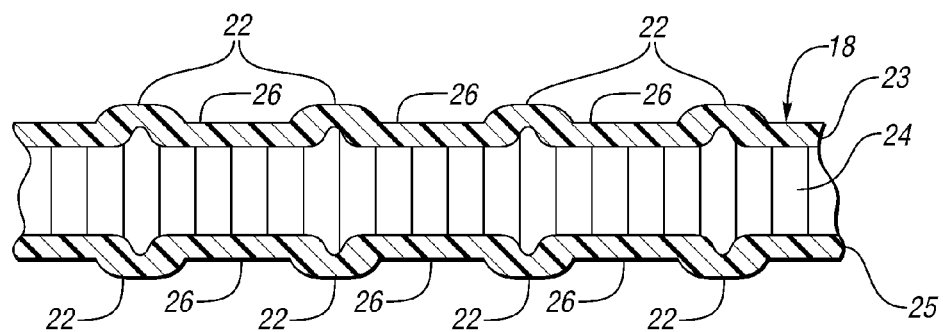
FIG. 5 is a side view, partially broken away and in cross section, of one embodiment of one of the components of the panel assemblies taken along lines 5-5 of FIG. 3.

As shown in FIG. 5, the composite component or panel 18 (as well as the component 16) has a load-bearing first outer layer 23, a second outer layer 25, and a core 24 positioned between the outer layers 25 and 23 and having a large number of cavities. The outer layers 25 and 23 are bonded to the core 24 by press molding typically after pre-heating the outer layers 25 and 23. The outer layers 25 and 23 are preferably fiber-reinforced thermoplastic layers. The thermoplastic may be a polyolefin such as polypropylene. The thermoplastic may alternatively be polyurethane. The fiber-reinforcement may be a glass mat, a natural fiber mat, or a woven or non-woven mat.

The core 24 may be a cellular core having a thermoplastic honeycomb structure. The core 24 may also be made of polypropylene honeycomb, aluminum honeycomb, balsa and polyurethane foam. The resulting composite component or panel 18 typically includes a lightweight, low density core such as the core 24 together with fiber-reinforced thermoplastic skins or layers such as the layers 25 and 23.

The composite component 18 may be compression or press molded using a variety of technologies which use a low temperature, compression molding apparatus. For example, the core 24 and the layers 25 and 23 are preferably generally of the type shown in U.S. patent documents U.S. Pat. Nos. 6,537,413; 6,050,630; and 2005/0189674.

After compression or press molding, parallel, raised portions or upper ridges 22 are formed in the layer 23 and the core 24 at the upper support surface of the panel 18. Also, parallel, lower portions or lower ridges 22 are formed in the layer 25 and the core 24 diametrically opposite the ridges 22 formed at the upper support structure. During such molding, portions of the core 24 between the upper ridges 22 and between the lower ridges 22 are crushed to reduce the thickness of those crushed areas to form corresponding, diametrically opposite, upper and lower grooves or furrows 26.

The raised portions 22 of the first outer layer 23 and the lower portions 22 of the second outer layer 25 are sized, shaped and arranged laterally adjacent to each other in patterns to provide the component 18 with strength to resist deflection from a load supported at various positions and orientations on the support surface of the first outer layer 23. In effect, the raised portions 22 form an integral, unitary support structure and the lower portions 22 also form an integral, unitary support structure.

Figure 6:
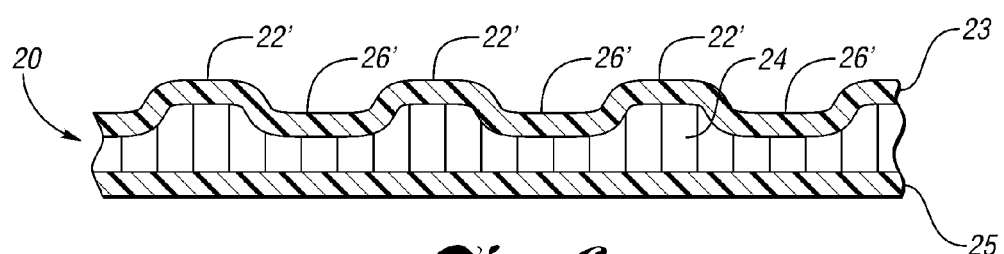
FIG. 6 is a view similar to the view of FIG. 5 but taken along lines 6-6 of FIG. 4 with respect to the cover.

Referring now to FIG. 6, the component 20 forms a movable lid for the load floor 10. The component 20 includes portions 22' similar to the raised portions 22 of FIG. 5. However, the component 20 does not include ridges on the opposite side of the component 20 unlike the component 18 of FIG. 5. The component 20 includes grooves or furrows 26' similar to the upper grooves or furrows 26 of FIG. 5. The grooves 26' and the portions or ridges 22' form a corrugated support surface which resists deflections from a load such as a stored but loose spare tire which may strike the undersurface of the lid 20 at various positions and orientations of the tire.

Figure 7:
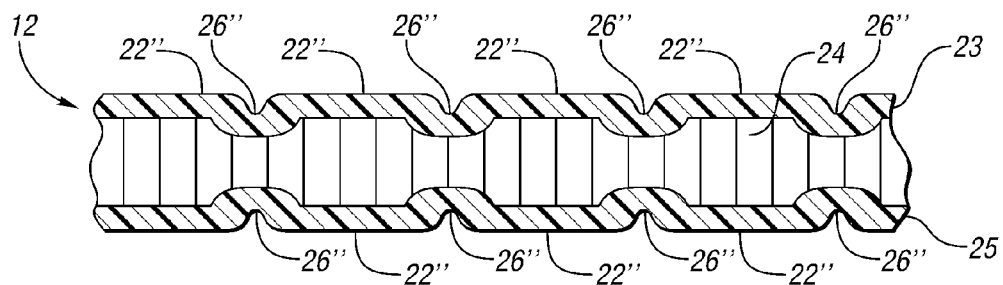
FIG. 7 is a view similar to the views of FIGS. 5 and 6 but taken along lines 7-7 of FIG. 3.

Referring now to FIG. 7, the component 12 (as well as the component 14) is similar to the component 18 of FIG. 5 in that the component 12 includes upper and lower ridges 22" as well as upper and lower grooves 26" between their corresponding ridges 22" to strengthen the component 12 without increasing the thickness of the core 24 or without adding separate support structures.

Each resulting panel or component 12, 14, 16, 18, 20 or 21 may have a thickness in the range of 5 to 25 mm.

In one example method of making the panel 18 (as well as the other components or panels), a stack of material is pressed in a low pressure, cold-forming mold. The stack is made up of the first layer or skin 23, the cellular core 24, and the second layer or skin 25. The stack is pressed at a pressure lying in the range of $10 \times 10^5$ Pa. to $30 \times 10^5$ Pa. The first and second skins 23 and 25, respectively, are preferably pre-heated to make them malleable and stretchable. Advantageously, in order to soften the first and second skins 23 and 25, respectively, heat is applied to a pre-assembly constituted by the stack made up of at least the first skin 23, of the cellular core 24, and the second skin 25 so that, while the panel 18 is being formed in the mold, the first and second skins 23 and 25 have a forming temperature lying approximately in the range of 160° C. to 200° C., and, in this example, about 180° C.

The living hinge between the panel 20 and the panel 21 can be formed in many different ways. For example, the living hinge can be formed by cutting through one of the outer layers and substantially through the core, as is well known in the art. Alternatively, the living hinge may be formed during the molding process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A compression-molded, composite component having a sandwich structure, the component comprising:
   a first outer layer having an outer surface;
   a second outer layer; and
   a core positioned between the first outer layer and the second outer layer and having a plurality of cavities, wherein the outer layers are bonded to the core by press molding and wherein portions of at least one of the outer layers are sized, shaped and arranged laterally adjacent to each other in a pattern to provide the component with strength to resist deflection from a load at various positions and orientations at the outer surface.

2. The component as claimed in claim 1, wherein the portions form an integral, unitary support structure.

3. The component as claimed in claim 2, wherein the support structure defines a series of parallel ridges and grooves formed by the press molding.

4. The component as claimed in claim 1, wherein portions of both of the outer layers are sized, shaped, and arranged laterally adjacent each other in a position to provide the component with strength to resist deflection.

5. The component as claimed in claim 1, wherein the core is a cellular core.

6. The component as claimed in claim 1, wherein the core is a thermoplastic core.

7. The component as claimed in claim 1, wherein the core is a honeycomb core.

8. The component as claimed in claim 7, wherein the honeycomb core is a thermoplastic honeycomb core.

9. The component as claimed in claim 1, wherein the outer layers are fiber-reinforced layers.

10. The component as claimed in claim 9, wherein the outer layers are fiber-reinforced thermoplastic layers.

11. The component as claimed in claim 1, wherein the first outer layer is a fiber-reinforced layer.

12. The component as claimed in claim 1, wherein the component has a thickness in a range of 5 to 25 mm.

13. The component as claimed in claim 1, wherein the outer layers are thermoplastic layers and the core is a thermoplastic core.

14. The component as claimed in claim 13, wherein the thermoplastic of the outer layers and the core is polypropylene.

15. The component as claimed in claim 1, wherein at least one of the outer layers is a woven outer layer.

16. The component as claimed in claim 15, wherein each of the outer layers is a woven outer layer.

17. A compression-molded, composite component having a sandwich structure for use in a vehicle, the component comprising:
    a first outer layer having an outer surface;
    a second outer layer; and
    a core positioned between the first outer layer and the second outer layer and having a plurality of cavities, wherein the outer layers are bonded to the core by press molding and wherein the portions of at least one of the outer layers are sized, shaped and arranged laterally adjacent to each other in a pattern to provide the component with strength to resist deflection from a load at various positions and orientations at the outer surface.

18. The component as claimed in claim 17, wherein the portions form an integral, unitary support structure.

19. The component as claimed in claim 18, wherein the support structure defines a series of parallel ridges and grooves formed by the press molding.

20. The component as claimed in claim 17 wherein portions of both of the outer layers are sized, shaped and arranged laterally in a pattern to provide the component with strength to resist deflection.

21. A compression-molded, composite component having a sandwich structure for use in the interior of a vehicle, the component comprising:
    a first outer layer having an outer surface;
    a second outer layer; and
    a core positioned between the first outer layer and the second outer layer and having a plurality of cavities, wherein the outer layers are bonded to the core by press molding and wherein portions of at least one of the outer layers are sized, shaped and arranged laterally adjacent to each other in a pattern to provide the component with strength to resist deflection from a load at various positions and orientations at the outer surface.

22. The component as claimed in claim 21, wherein the portions form an integral, unitary support structure.

23. The component as claimed in claim 22, wherein the support structure defines a series of parallel ridges and grooves formed by the press molding.

24. The component as claimed in claim 21 wherein both of the outer layers have portions sized, shaped and arranged laterally adjacent each other to provide the component with strength to resist deflection.

* * * * *